(12) United States Patent
Petrenec et al.

(10) Patent No.: US 10,889,184 B2
(45) Date of Patent: Jan. 12, 2021

(54) ALL-WHEELS DRIVE ARRANGEMENT WITH LOW INPUT TORQUE ESPECIALLY FOR THE SKID-STEER LOADERS

(71) Applicant: KOVACO Electric, a.s., Prague (CZ)

(72) Inventors: Slavomir Petrenec, Krupina (SK); Ján Hanes, Dobrá Niva (SK)

(73) Assignee: KOVACO Electric, a.s., Prague (CZ)

( * ) Notice: Subject to any disclaimer, the term of this patent is extended or adjusted under 35 U.S.C. 154(b) by 0 days.

(21) Appl. No.: 15/970,009

(22) Filed: May 3, 2018

(65) Prior Publication Data

US 2018/0319275 A1 Nov. 8, 2018

(30) Foreign Application Priority Data

May 5, 2017 (SK) .................................. 50034-2017

(51) Int. Cl.
*B60K 17/342* (2006.01)
*B62D 55/125* (2006.01)
(Continued)

(52) U.S. Cl.
CPC .......... *B60K 17/342* (2013.01); *B60L 50/51* (2019.02); *B62D 11/04* (2013.01); *B62D 11/183* (2013.01); *B62D 55/125* (2013.01); *B60K 17/3467* (2013.01); *B60L 7/06* (2013.01); *B60L 2200/40* (2013.01); *B62D 61/12* (2013.01)

(58) Field of Classification Search
CPC .... B60K 17/342; B62D 61/12; B62D 11/182; B62D 11/04; B62D 11/183; B62D 55/125; B60L 50/51
See application file for complete search history.

(56) References Cited

U.S. PATENT DOCUMENTS

| 4,245,712 A | * | 1/1981 | Itey-Bernard | ............ | B60K 1/02 |
| | | | | | 180/246 |
| 4,407,381 A | * | 10/1983 | Oswald | ................ | B60K 17/342 |
| | | | | | 180/24.12 |

(Continued)

FOREIGN PATENT DOCUMENTS

| GB | 743027 A | * | 1/1956 | ........... | B60K 17/043 |
| JP | 2016159700 A | | 9/2016 | | |

(Continued)

OTHER PUBLICATIONS

E.-M. Hackbarth et al., "Driving Mechanics of the Tracked Vehicles", Dec. 31, 2016, pp. 360-365 (12 pages) and English Translation.

(Continued)

*Primary Examiner* — Justin Holmes

(74) *Attorney, Agent, or Firm* — Collard & Roe, P.C.

(57) ABSTRACT

In an all-wheel drive arrangement with low input torque especially for the skid-steer loaders controlled by a control unit, made up of battery, frequency converter, electric joystick and/or electro-hydraulic switchgear, both sides of the vehicle control include at least two wheels, each wheel connected to a planetary gearing. The gearing equipped with the infinite gear member (e.g. belt, chain) transfers the torque from the electric motor to each wheel on one side of the vehicle controlled, whereby the planetary gear directly drives the particular wheel.

2 Claims, 2 Drawing Sheets

(51) Int. Cl.
  *B62D 11/18*   (2006.01)
  *B62D 11/04*   (2006.01)
  *B60L 50/51*   (2019.01)
  *B60K 17/346*   (2006.01)
  *B62D 61/12*   (2006.01)
  *B60L 7/06*   (2006.01)

(56) References Cited

U.S. PATENT DOCUMENTS

| | | | |
|---|---|---|---|
| 2004/0200648 A1* | 10/2004 | Tarasinski | B60L 50/50 180/65.7 |
| 2008/0230284 A1* | 9/2008 | Schoon | B60K 1/02 180/6.5 |
| 2010/0059305 A1 | 3/2010 | Osorn et al. | |
| 2012/0277059 A1* | 11/2012 | Akutsu | B60W 30/025 477/5 |
| 2013/0015005 A1* | 1/2013 | Koga | B60L 7/26 180/6.5 |
| 2016/0068183 A1* | 3/2016 | Matsuoka | B60L 50/51 701/41 |
| 2017/0369100 A1 | 12/2017 | Higuchi et al. | |

FOREIGN PATENT DOCUMENTS

| | | |
|---|---|---|
| KR | 101350148 B1 | 1/2014 |
| KR | 101649538 B1 | 8/2016 |
| WO | 2010/046723 A1 | 4/2010 |
| WO | 2016/140160 A1 | 9/2016 |

OTHER PUBLICATIONS

Extended European Search Report in Application No. EP 18475501.5 / 3403873 dated Oct. 10, 2018, (15 pages).
Response to the Extended European Search Report in Application No. EP 18475501.5 / 3403873 dated May 16, 2019, (4 pages).

* cited by examiner

ALL-WHEELS DRIVE ARRANGEMENT WITH LOW INPUT TORQUE ESPECIALLY FOR THE SKID-STEER LOADERS

CROSS REFERENCE TO RELATED APPLICATIONS

Applicant claims priority under 35 U.S.C. § 119 of Slovakian Application No. PP 50034-2017 filed May 5, 2017, the disclosure of which is incorporated by reference.

BACKGROUND OF THE INVENTION

1. Field of the Invention

The present invention refers to the all-wheels drive arrangement design concept especially for the skid-steer loaders.

2. Description of the Related Art

At present, the hydrostatic drive has been used do drive the skid-steer loaders. The system has been designed so that the torque from the engine is directly transmitted both to front and rear wheels through the chain gear or gear train. In other words, a single gearing drives each wheel on one side of the vehicle controlled. It follows that such gearing has been very heavy and bulky in case of the gear train and, in both cases, these gearings have been maintenance-intensive, since they transfer maximum torque to the wheels.

SUMMARY OF THE INVENTION

The present invention describes the design concept that eliminates the shortcomings mentioned. The principle of the invention consists in the fact that the infinite gear member (e.g. belt, chain) transfers the torque from the electric motor to each wheel on one side of the vehicle controlled, whereby the planetary gear directly drives the particular wheel.

Each wheel has been equipped with own infinite gear member-driven planetary gear. The electric motor directly drives the infinite gear member. The infinite gear member transfers the low torque to each wheel's planetary gear. The vehicle controlled needs the electric motor and the infinite gear member for each side. If the electric motor drive has been used, the frequency converter, electric joystick and battery have been included into the circuit. At least one wheel has been equipped with the electromagnetic brake on each side. The control unit controls the drive.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings, wherein the same or functionally equivalent components are provided with the same reference symbols.

DETAILED DESCRIPTION OF PREFERRED EMBODIMENTS

Figure 1:
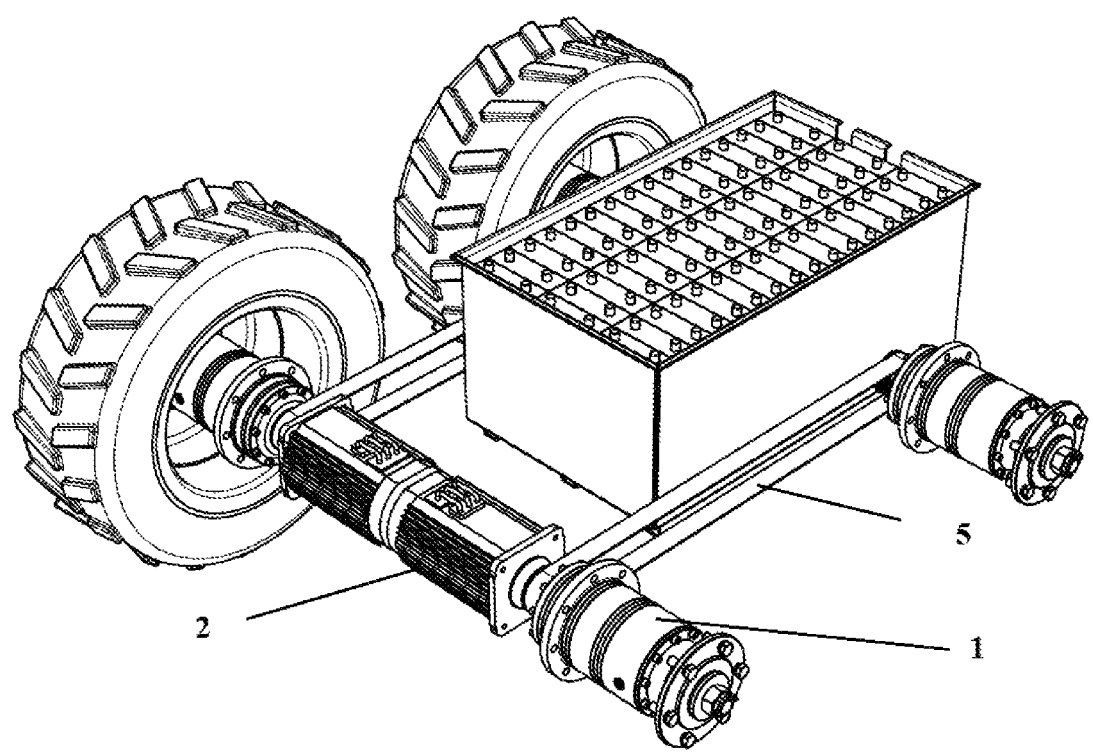
FIG. 1 illustrates the axonometric view on the all-wheels drive arrangement with low input torque especially for the skid-steer loaders.
Figure 2:
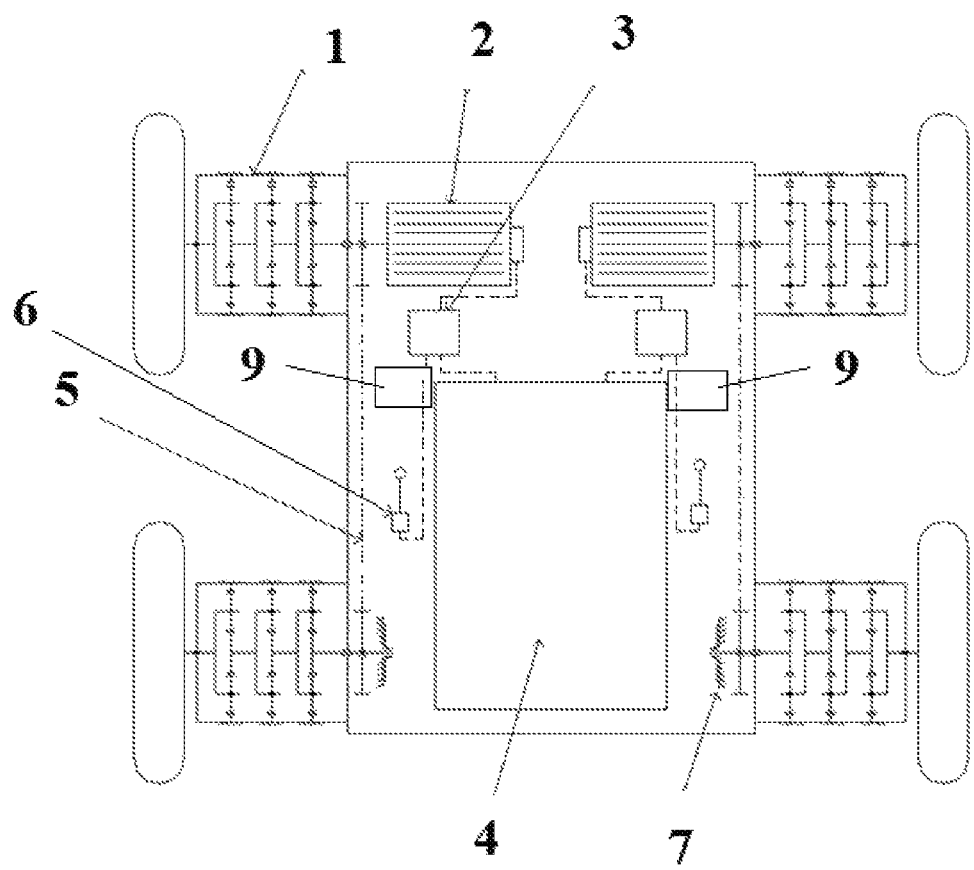
FIG. 2 illustrates the all-wheel drive arrangement diagram consisting of the electric motor and infinite gear member drives on both sides of the vehicle controlled.

The gearing 5 equipped with the infinite gear member (e.g. belt, chain) transfers the torque from the electric motor 2 to each wheel on one side of the vehicle controlled, whereby the planetary gear 1 directly drives the particular wheel. Each wheel has been equipped with own planetary gear 1 driven by the infinite gear member 5. The electric motor 2 directly drives the infinite gear member 5. The infinite gear member 5 transfers the low torque to each wheel's planetary gear 1. The vehicle controlled needs the electric motor 2 and the infinite gear member 5 for each side. If the electric motor drive 2 has been used, the frequency converter 3, electric joystick 6 and battery 4 have been included into the circuit. At least one wheel on each side has been equipped with the electromagnetic brake 7. The control unit 9 controls the drive.

The control unit 9, consisting of battery 4, frequency converter 3, electric joystick 6 and/or electro-hydraulic switchgear 3a controls the all-wheels drive arrangement especially for the skid-steer loaders, whereby both sides of the vehicle controlled consist of at least two wheels where each wheel has been connected to the planetary gearing 1, with the planetary gearings 1 linked by the infinite gear member 5 on one side of the vehicle controlled, whereby the infinite gear member has been connected to a single electric motor 2 connected to battery 4. If the electric motor drive has been used, at least one wheel equipped with the electromagnetic brake 7 can be on each side. The infinite gear member 5 can be of either the belt or chain type.

INDUSTRIAL APPLICABILITY

The all-wheel drive arrangement with low input torque can be used especially in the skid-steer loaders or in other constructionally similar machines.

What is claimed is:

1. An all-wheel drive arrangement for a skid-steer loader, the drive arrangement comprising:
    a control unit that comprises a battery, a frequency converter, and an electric joystick, the control unit being configured for controlling the drive arrangement,
    exactly two wheels disposed on both sides of the vehicle;
    a plurality of planetary gearings arranged such that a separate planetary gearing is connected to each wheel, wherein each planetary gearing is linked to the other planetary gearing on a same side of the vehicle by an infinite gear member in the form of a belt, and
    two electric motors, one for each side of the vehicle, each electric motor being connected to the battery and each electric motor being connected to the infinite gear member on a respective side of the vehicle, wherein the one motor on each side of the vehicle drives both wheels on the respective side by transferring torque from the infinite clear to the planetary clearings on the respective side.

2. The all-wheel drive arrangement according to claim 1, wherein at least one of the wheels on each side of the vehicle is equipped with an electromagnetic brake.

* * * * *